(12) United States Patent
Yang (10) Patent No.: US 7,639,673 B2
(45) Date of Patent: Dec. 29, 2009

(54) METHOD AND APPARATUS FOR SDH/SONET FRAME ALIGNMENT

(75) Inventor: Fengguo Yang, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 775 days.

(21) Appl. No.: 11/242,451

(22) Filed: Oct. 3, 2005

(65) Prior Publication Data

US 2006/0067370 A1    Mar. 30, 2006

Related U.S. Application Data

(63) Continuation of application No. PCT/CN2004/000305, filed on Apr. 2, 2004.

(30) Foreign Application Priority Data

Apr. 2, 2003    (CN) .............. 2003 1 08880

(51) Int. Cl.
*H04L 12/50* (2006.01)
(52) U.S. Cl. .............. 370/357; 370/474; 370/503
(58) Field of Classification Search ............ 370/359, 370/509, 503, 516
See application file for complete search history.

(56) References Cited

U.S. PATENT DOCUMENTS

| | | | |
|---|---|---|---|
| 5,113,395 A | 5/1992 | Murakami et al. | |
| 5,461,622 A | 10/1995 | Bleickardt et al. | |
| 5,666,351 A | 9/1997 | Oksanen et al. | |
| 6,834,059 B2 * | 12/2004 | Kibe | 370/517 |
| 6,870,831 B2 * | 3/2005 | Hughes et al. | 370/352 |
| 6,912,201 B1 * | 6/2005 | Yoshida et al. | 370/248 |

FOREIGN PATENT DOCUMENTS

| | | |
|---|---|---|
| EP | 1119123 A2 | 7/2001 |
| EP | 1198086 A2 | 4/2002 |
| JP | 7170239 | 7/1995 |
| JP | 11-122206 | 4/1999 |
| JP | 2000-324076 | 11/2000 |

OTHER PUBLICATIONS

International Telecommunication Union (ITU) Recommendations G.707; Nov. 25, 1988.*
International Search Report for PCT/CN2004/000305, Jul. 15, 2004.
Canadian Office Action for Application No. 2,520,906, dated Jul. 13, 2007.
European Office Action for Application No. 04 725 267.1, dated Feb. 20, 2007.
Supplementary European Search Report for Application No. 04 725 267.1, dated Sep. 25, 2006.

* cited by examiner

*Primary Examiner*—Seema S Rao
*Assistant Examiner*—Henry Baron
(74) *Attorney, Agent, or Firm*—Marshall, Gerstein & Borun LLP (57) ABSTRACT

The invention discloses a frame alignment method. Based on time-sharing structure of SDH/SONET data, the methods use one common circuit to complete functions like pointer interpretation, pointer generation and payload interception and storage, etc. The method stores information of every channel which is being processed respectively, and then controls reading and writing memories and the operations of the whole common circuit by the scheduling of input signals. The invention also opens a frame aligning circuit; improves circuit efficiency by multiplexing common circuit while decreases logistic scale of processing. The invention is mainly engaged to frame alignment of a SDH/SONET system.

10 Claims, 9 Drawing Sheets

| Synchronous Digital Hierarchy | Bit rate (kbit/s) |
|---|---|
| 0 | 51840 |
| 1 | 155520 |
| 4 | 622080 |
| 16 | 2488320 |
| 64 | 9953280 |
| 256 | 39813120 |

Fig.1

| Virtual container | VC bit rate(kbit/s) | Payload bit rate (kbit/s) |
|---|---|---|
| VC-11 | 1664 | 1600 |
| VC-12 | 2240 | 2176 |
| VC-2 | 6848 | 6784 |
| VC-3 | 48960 | 48384 |
| VC-4 | 150336 | 149760 |
| VC-4-4c | 601344 | 599040 |
| VC-4-16c | 2405376 | 2396160 |
| VC-4-64c | 9621504 | 9584640 |
| VC-4-256c | 38486016 | 38338560 |

METHOD AND APPARATUS FOR SDH/SONET FRAME ALIGNMENT

CROSS-REFERENCE TO RELATED APPLICATIONS

This is a continuation of International Application No. PCT/CN2004/000305, which was filed on Apr. 2, 2004, and which, in turn, claimed the benefit of Chinese Patent Application No. 03108880.5, which was filed on Apr. 2, 2003, the entire disclosures of which are hereby incorporated herein by reference.

BACKGROUND OF THE DISCLOSURE

1. Field of the Technology

The invention generally relates to frame processing techniques for the Synchronous Digital Hierarchy (SDH)/Synchronous Optical Network (SONET) and, more specifically, introduces a method and circuit for SDN/SONET frame alignment.

2. Background of the Invention

The SDH/SONET system is a signal transport system that transports signals at different rate levels on several standard-rate interfaces through an interleave multiplex and synchronous multiplex way. The SDH and the SONET are almost the same hierarchies except part of transmission rates and multiplexing paths are slightly different. Therefore, methods for the SDH system are introduced and those for the SONET system are completely same in principle. The ITU.T G707 has a detailed description of the SDH architecture.

Figure 1:
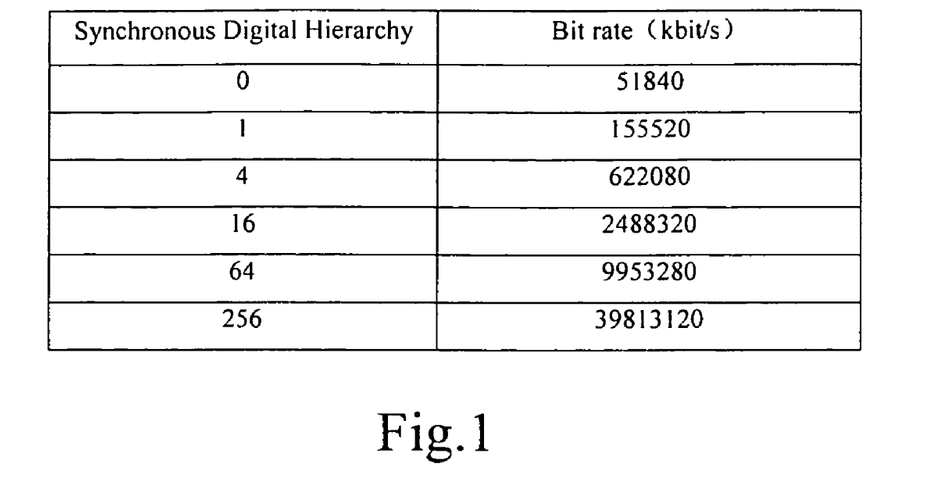
FIG. 1 shows SDH bit rates.
Figure 2:
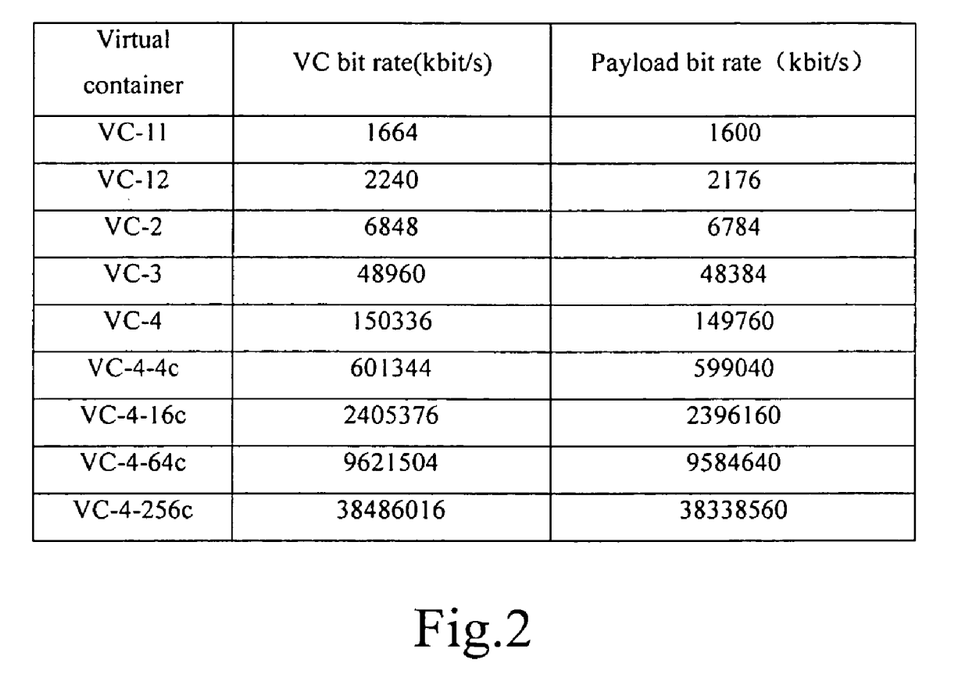
FIG. 2 shows SDH Virtual Containers (VC).

FIG. 1 shows the rate hierarchy supported by the SDH system. FIG. 2 shows rates of Virtual Container with different rate levels and being supported by the SDH.

Figure 3:
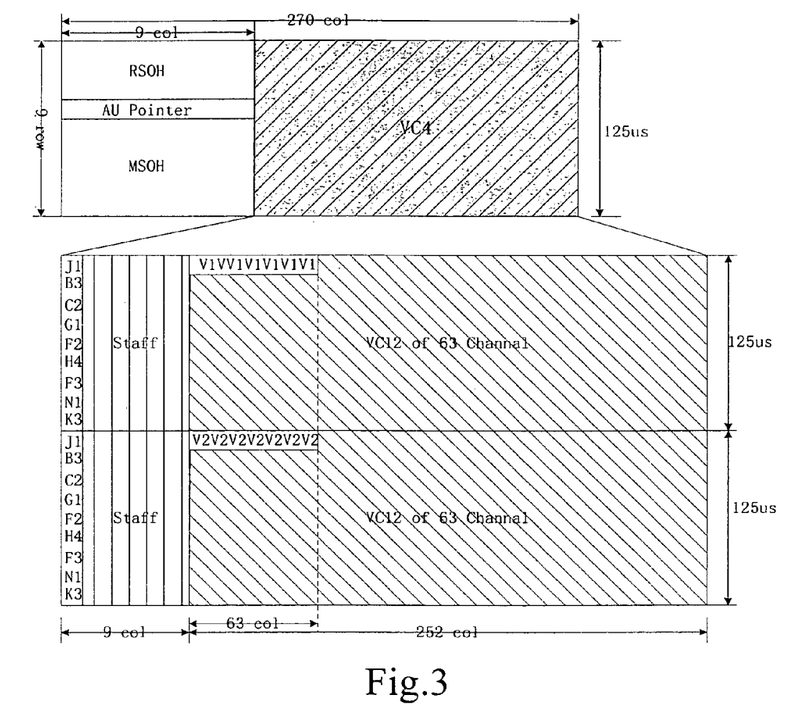
FIG. 3 shows a frame structure of the STM-1.

FIG. 3 shows the frame structure of SDH STM-1 (Synchronous Transport Module-1), in which the VC4s are formed by 63 VC12s.

The STM-2 frame is composed of 9 rows and 270 columns, namely totaling 2430 bytes, and takes 125 μs. Therefore, the rate of STM-1 in FIG. 1 is 155.520 Mbps. The first 9 columns of each frame are pointer addresses for RSOH (Regenerator Section Overhead), MSOH (Multiplexer Section Overhead) and AU-4 Pointer, and the rest 261 columns are for VC4. In the VC4, the first column is for Path Overhead (POH). When the VC4 is formed by 63 VC12s, the 8 columns that follow the POH column are the byte stuff columns, and the 252 columns that follow the stuff columns are formed by 63 TU12s that are multiplexed to TUG2s and then to TUG3s. See FIG. 9.

Figure 4:
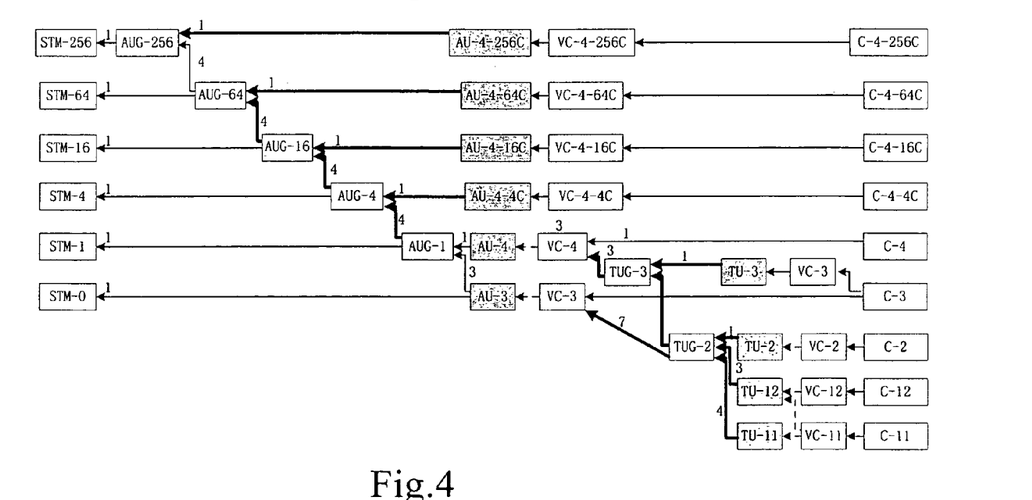
FIG. 4 shows the multiplexing paths of SDH.

FIG. 4 shows the multiplexing paths defined by the G707 standard for different VC rates. In FIG. 4, the block with background color indicates pointer processing; the thick real line indicates multiplexing; the dot line indicates aligning and the thin real line indicates mapping.

Figure 5:
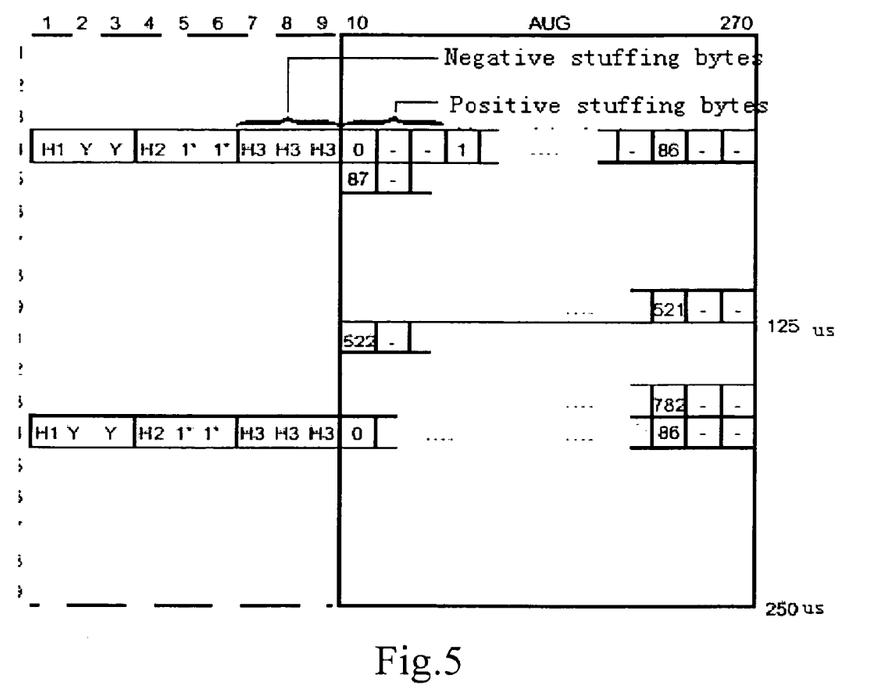
FIG. 5 shows the AU4 pointer.
Figure 6:
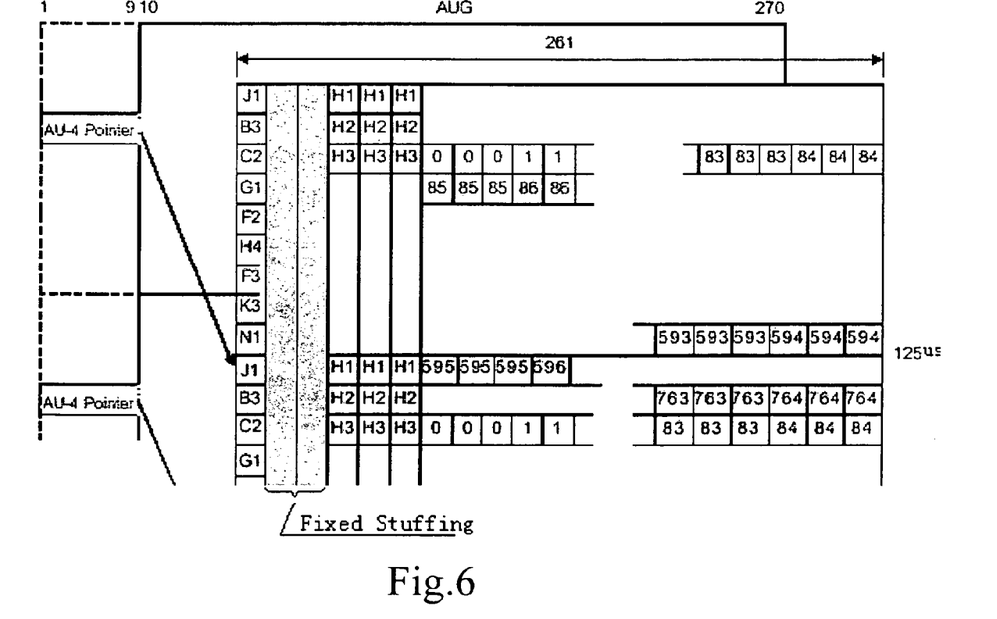
FIG. 6 shows the TU3 pointer.
Figure 7:
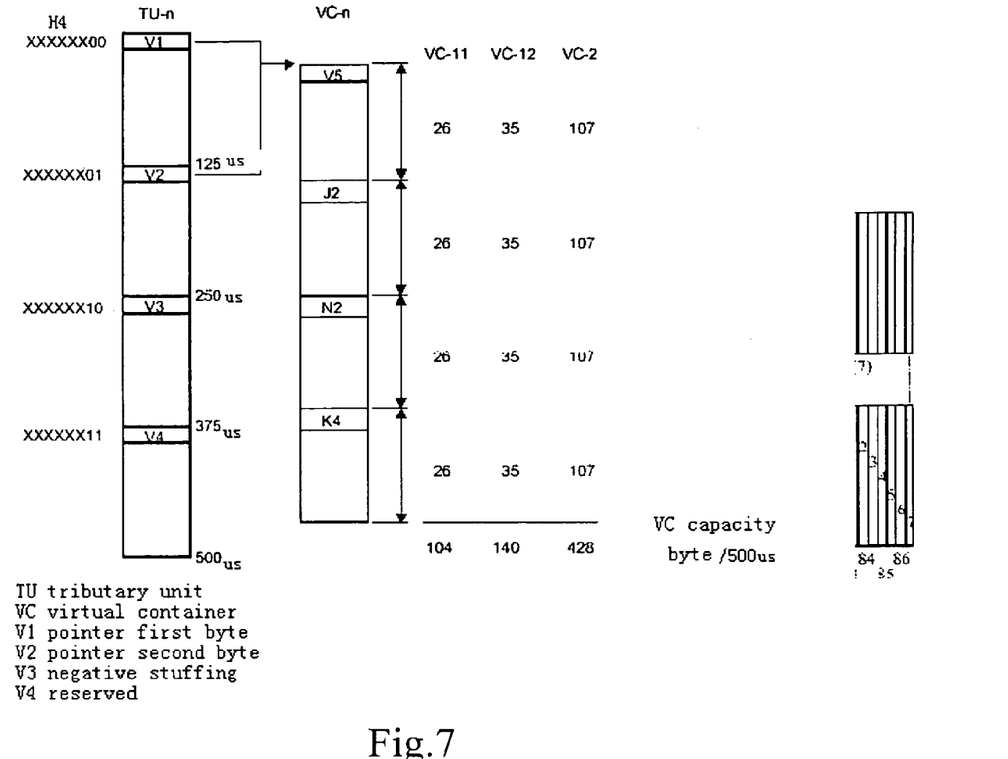
FIG. 7 shows the TU12/TU11 pointer.

During multiplexing, it often happens that the VC rate doesn't match the rates of the TU or AU to which the VC want to be multiplexed. In this case, the SDH deploys a pointer to locate the VC starting byte from a fixed position in the frame (the fixed position is the H3 byte for AU4, the H3 byte for TU3 and the V2 byte for TU1). The pointer value is adjusted with the positive justification and negative justification. For AU4, as shown in the FIG. 5, H1 and H2 are the pointers showing the starting byte of the VC-4, H3 is for negative justification and the three bytes after H3 is for positive justification. The FIG. 6 shows the TU3 pointer, and the FIG. 7 shows the TU12/TU11 pointer; wherein TU is the tributary unit, VC is the virtual container, V1 is the first byte of the pointer and V2 is the second byte of the pointer, V3 is the negative justification byte and V4 is a reserved byte.

Figure 8:
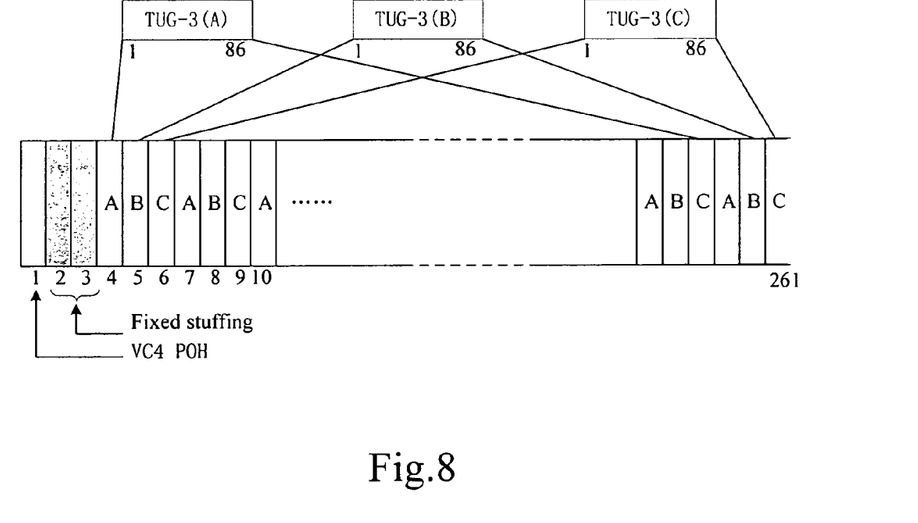
FIG. 8 shows the interleaving from TUG3s to VC4s.
Figure 9:
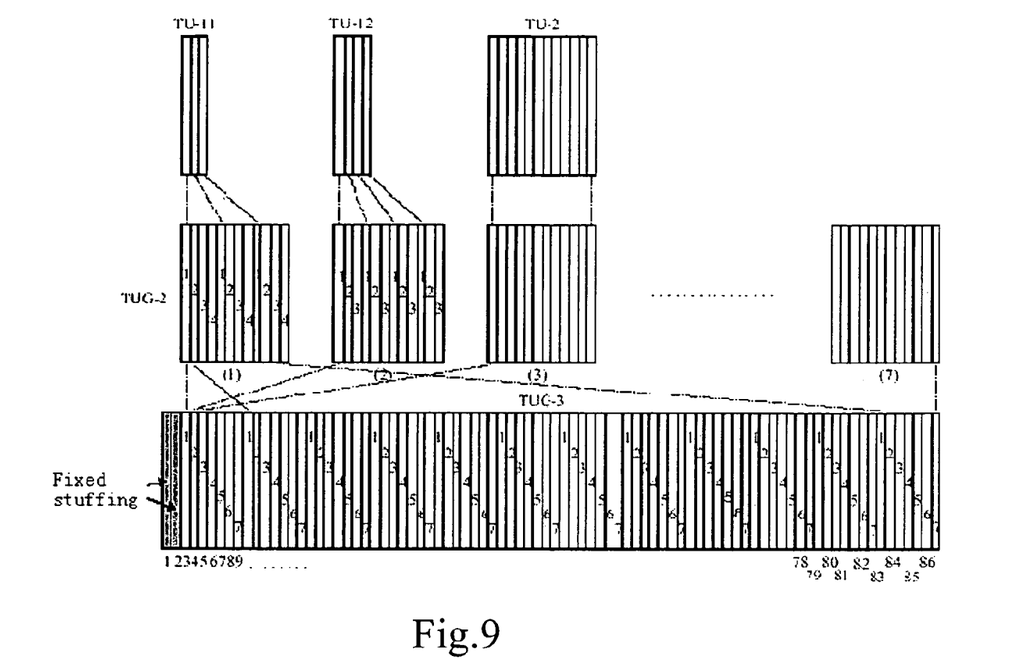
FIG. 9 shows the interleaving from TU11/TU12s to the TUG3s.

FIGS. 8 and 9 show an interleaving processing where the TU11/TU12s are multiplexed into the TUG2s, and then the TUG2s are multiplexed into the TUG3s, and finally the TUG3s are multiplexed into the VC4.

The SDH multiplexing hierarchy defines a channel signal rate lower than VC4 as the lower order channel and a channel signal rate above the VC4 as the higher order channel. The lower order signals are interleaved into the TUG2s by columns, and then the TUG3s are interleaved into the TUG3s by columns, and then the TUG3s are interleaved into the VC4 by columns. When multiplexing lower order signals to a higher order virtual container, the pointer of the higher order virtual container needs to be adjusted for rate matching, so pointers of different higher order virtual containers may have different values. Therefore, before interleaving, the virtual containers need to be aligned. At present, the alignment is made with the method called Tributary Unit Payload Processor (TUPP).

From the ingress direction of a high order signal, the TUPP finds the pointers of the lower order signals. With interpretation of a lower order signal pointer, the lower order signal payload is obtained and stored in an FIFO queue. Later, based on aligning requirement, the timing signal is generated. With the timing signal, the FIFO output is controlled and a new pointer justification is generated. The payloads of lower order signals in the FIFO and the generated pointers form an aligned high order signal that is the egress signal of the TUPP.

Figure 10:
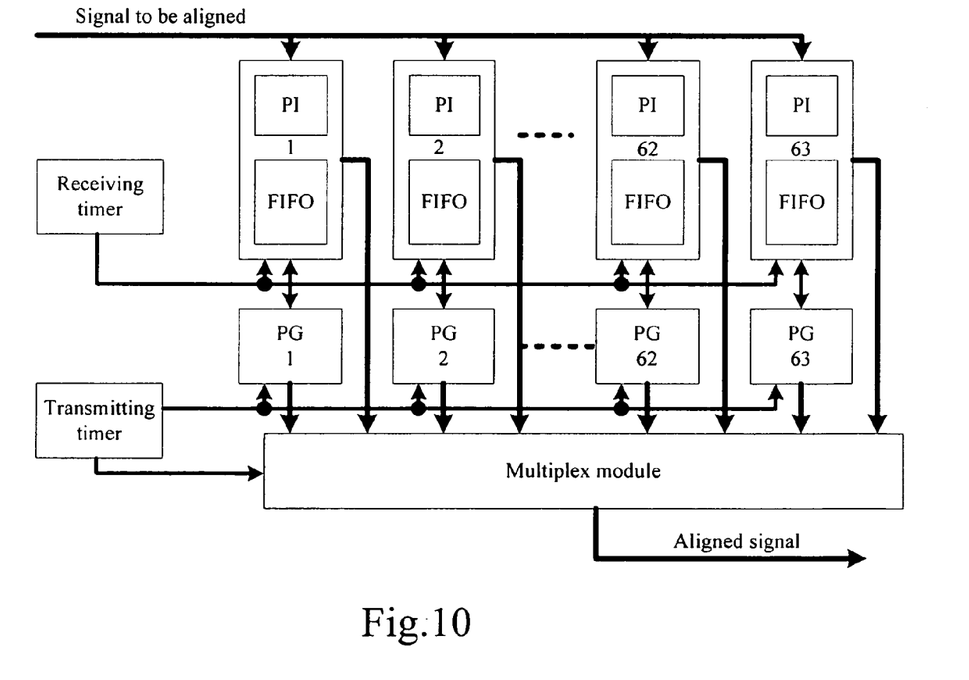
FIG. 10 shows a diagram of present frame alignment processing.

Taking the lower order traffic TU12 as an example, shown in FIG. 10, the Receiving Timer and Transmitting Timer generate necessary timing signals; the pointer interpreters (PI) of the modules 1, 2, . . . 63 make pointer interpretation of each channel respectively to obtain the payload position of each channel; under the control of the RecTiming signal, the payloads are stored in the First-In-First-Out (FIFO) memories; the Pointer Generator modules PG1, PG2, . . . PG63 generate new pointers for each channel; and the Multiplexing module regenerates the payloads and their new pointers that are aligned for the higher order signal VC4.

The alignment processing of the TU11, TU3 or payloads mapped by them is similar as above.

The above method meets demands of system for lower order signals in early SDH/SONET development phase when the system capacity is limited; However, with increase of system demands for lower order traffic, the method can hardly meet market needs. The TUPP is implemented by an ASIC on usual, and each ASIC can only process several channels, which leads to many ASICs in system. This makes serial problems for the system, such as system complexity increase, power consumption rising, system integration and system stability decrease etc.

SUMMARY OF THE INVENTION

In accordance with one aspect, disclosed is a frame aligning method to overcome the low-level technology integration and the low utility of the present aligning integrated circuit.

Another aspect of the disclosure provides a frame alignment integrated circuit that has higher integration level and higher utility factor.

In accordance with one embodiment, the frame aligning method includes the steps of:

processing every channel of a frame time-sharingly through common circuits including at least a common pointer interpreter module and a pointer generator module;

based on the structure and control information of the frame to be aligned, said common circuit generating the receiving pulses indicating positions of a channel pointer's first byte and second byte;

said common pointer interpreter module receiving the first-byte and second-byte information of all channel pointers according to said receiving pulses, and storing the first-byte information;

according to the channel sequence, said common pointer interpreter module interpreting channel pointers to obtain pointer status information;

according to the state information obtained, the common pointer interpreter module generating control signals to store channel payload;

generating a time signal for a new frame required and providing to said pointer generator module;

based on pointer offset and adjustment information of each channel, said pointer generator module creating new channel pointers for all channels;

generating the control signal according to timing signals of said new frame and the new channel pointers generated by said pointer generator;

with said control signal, reading the payload and generated pointer of each channel to form aligned data frame.

In some cases, said obtaining pointer status information, respectively, includes the steps of:

according to first-byte and second-byte pointer information, pointer status information and first-byte and second-byte information of last frame, pointer interpretation module interpreting current channel pointer and storing obtained status information of channel pointer.

Said obtaining pointer state information may be realized according to ITU.

Said creating new channel pointers, respectively, may include the steps of:

depending on channel payload, pointer generator module calculating the offset of the channel pointer;

the new pointer and state information of the channel being created and stored based on the offset, channel adjustment information and state information of last frame.

Said creating new channel pointer may be realized according to ITU.

Said payloads and generated pointers of all channels may be stored in one memory.

Address collision may be avoided for said memory.

In accordance with another aspect, the frame aligning integrated circuit, includes a receiving timer, a pointer interpreter module, a transmitting timer, a pointer generator module and a first memory;

where said receiving timer is connected with the pointer interpreter module and the first memory respectively, receives frame to be aligned and the frame control signals, and then based on the frame control signals, it generates timing signals indicating different positions of frame signals; and sends the timing signals to pointer interpreter module; based on timing signals and pointer interpretation results given by pointer interpreter module, it controls the first memory to store frame data; and where said pointer interpreter module is connected with the receiving timer, receives frame to be aligned; under control by timing signals from the receiving timer, interprets channel pointers of Tributary Units in a frame; sends pointer interpretation results to the receiving timer; and, where said transmitting timer is connected with the pointer generator module and first memory, receives control signals for new frame system requires; based on the frame control signals, it generates timing signals indicating different positions of a new frame, based on timing signals and new channel pointer state sent by pointer generator module, controls the first memory to read frame data; and, where said pointer generator module is connected with the transmitting timer and first memory; under control of timing signals provided by the transmitting timer, creates new channel pointers of Tributary Units and stores the new channel pointers into the first memory; and, where said first memory is connected with the receiving timer, transmitting timer and pointer generator module, stores payloads of all channels under the control of timing signals provided by the receiving timer; and stores newly generated pointers of all channels, and outputs payloads and new pointers of all channels under the control of timing signals provided by the transmitting timer.

Said pointer interpreter module includes a first read-write controller, a first memory, a second memory, a third memory, a fourth memory and a pointer interpreter finite-state-machine:

where said first read-write controller is connected with the receiving timer, second memory, third memory and fourth memory, receives timing signals generated by the receiving timer to create read-write control signals to the second, third and fourth memories; and, where said second and third memories are connected with the first read-write controller and pointer interpreter finite-state-machine, under control of first read-write controller, store channel pointer information of frame received, or output the channel pointer information to the pointer interpreter finite-state-machine, and, where said fourth memory is connected with the first read-write controller and pointer interpreter finite-state-machine, under control of first read-write controller, stores pointer state information sent by the pointer interpreter finite-state-machine, or sends pointer state information to the pointer interpreter finite-state-machine; and, where said pointer interpreter finite-state-machine is connected with the second, third and fourth memories; at specific timing signals provided by said receiving timer, interprets signals in second, third and fourth memories and then stores interpretation results in the fourth memory and outputs them to the receiving timer.

Said pointer generator module may include a second read-write controller, a fifth memory, a sixth memory and a pointer generator finite-state-machine:

where said second read-write controller may be connected with the transmitting timer, fifth memory and sixth memory, receives timing signals from transmitting timer to generate read-write control signal for fifth and sixth memories; and, where said fifth memory may be connected with the second read-write controller and pointer generator finite-state-machine, stores the channel pointer offset and outputs them to the pointer generator finite-state-machine; and, where said sixth memory may be connected with the second read-write controller and pointer generator finite-state-machine, stores frame states; and, where said pointer generator finite-state-machine may be connected with the transmitting timer, fifth and sixth memories, under a specific timing signal from the transmitting timer and according to signals stored in the fifth and sixth memories, it generates new pointer and the pointer's state, and stores the state in the sixth memory and outputs the state to the first memory.

Said pointer generator module may include a common counter for all channels;

where said counter may be connected with the fifth memory; starts counting at the second address of each channel; increases count value of relevant channel by one after it reads one byte from the first memory; creates pointer offset and outputs it to the fifth memory.

Said pointer generator module may include an address comparator, where said address comparator may be connected with the receiving timer and transmitting timer, receives the writing address generated by the receiving timer and reading address generated by the transmitting timer, and compares them to determine whether the positive justification or negative justification is needed, and then sends justification information to the pointer generator finite-state-machine.

As a result, the following advantages are presented:

With time-sharing, the circuit utility factor is raised; and, with multiplex structure, the integrated level of each ASIC is increased.

DETAILED DESCRIPTION OF THE INVENTION

The invention is a frame alignment method and circuit used for SDH/SONET. The characteristics of the invention are as follows:

The Pointer Interpreter (PI), Pointer Generator (PG) and Payload memory are common for every lower order channel (63 TU12s, or 84 TU11s, or 3 TU3s or their mixture), so each of them can be replaced by a common time-sharing circuit;

Having been processed by the common time-sharing circuits, pointer value of each channel is stored in a memory;

The ingress signal timing controls the common time-sharing circuit and access of the memory.

In the following, an embodiment of the alignment of a VC4 that is composed of TU12s is described in detail.

Figure 11:
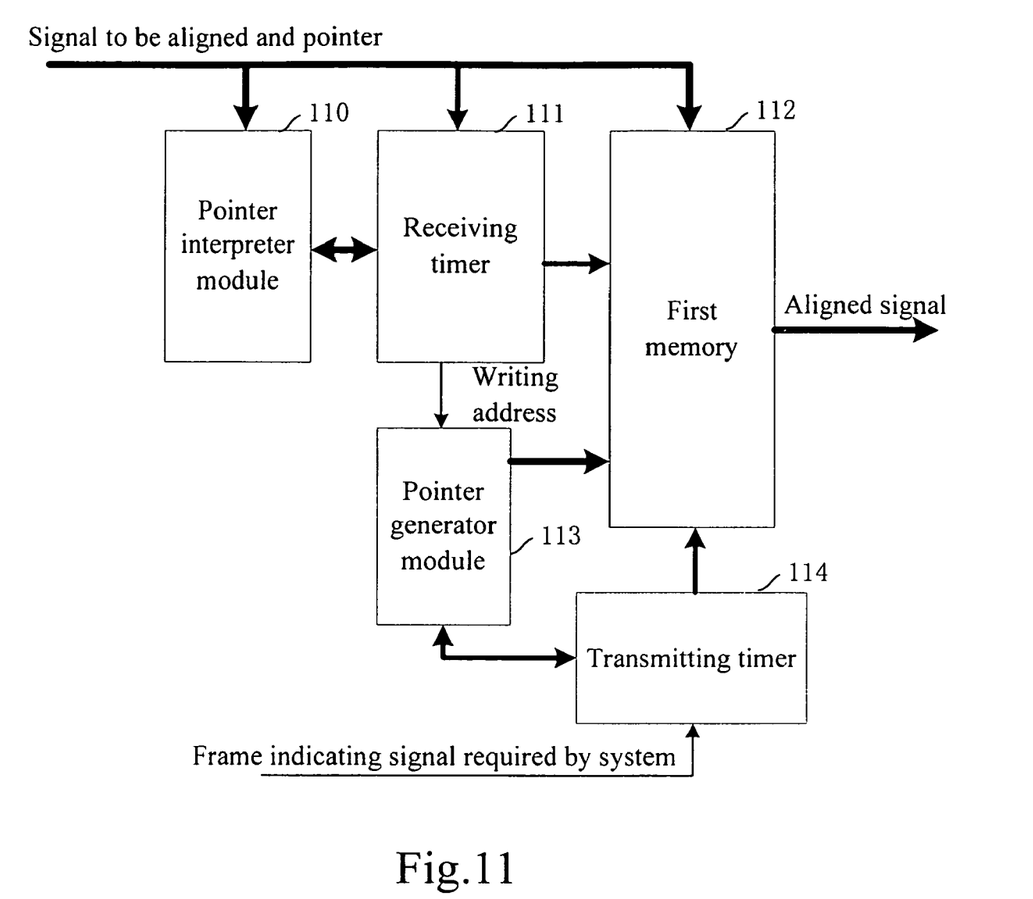
FIG. 11 shows a diagram of frame alignment of the invention.

FIG. 11 shows the frame alignment circuit includes a pointer interpreter module 110, a receiving timer 111 that generates RecTiming signal, a first memory 112, a pointer generator module 113 and a transmitting timer 114 that generates TransmitTiming signal.

The pointer interpreter module 110, the receiving timer 111 and the first memory 112 receive the VC4 indication signals and the VC4 frame data, vc4_data, which will be aligned.

The receiving timer 111 is connected with the pointer interpreter module 110 and the first memory 112, and generates related timing signals based on the SDH frame structure, the spe signal of payload in indication signals of VC4 frame and starting signal j1 of VC4 frame.

In detail, the positions of every signal in a VC4 frame are relatively fixed to the starting signal j1, and the receiving timer 111 respectively generates the indicating pulses r_ts_v1 and r_ts_v2 for the first byte V1 and the second byte V2, which are used to indicate pointers of 63 channels; the indicating pulses r_ts_v3 and r_ts_v3$p$ for the pointer justification bytes V3 and V3$p$ of the 63 channels; the sequential counter signal r_tu_num indicating sequence of the 63 channels and the indicating pulse r_ts_h4 for the path overhead byte H4.

The receiving timer 111 sends the indicating pulses r_ts_v1, r_ts_v2 and r_tu_num to the pointer interpreter module 110.

Based on the r_ts_v1, r_ts_v2, r_tu_num and VC4 frame signals, the pointer interpreter module 110 generates the interpretation results including the pointer value and positive justification or negative justification bytes, and then send them to the receiving timer 111.

Figure 15:
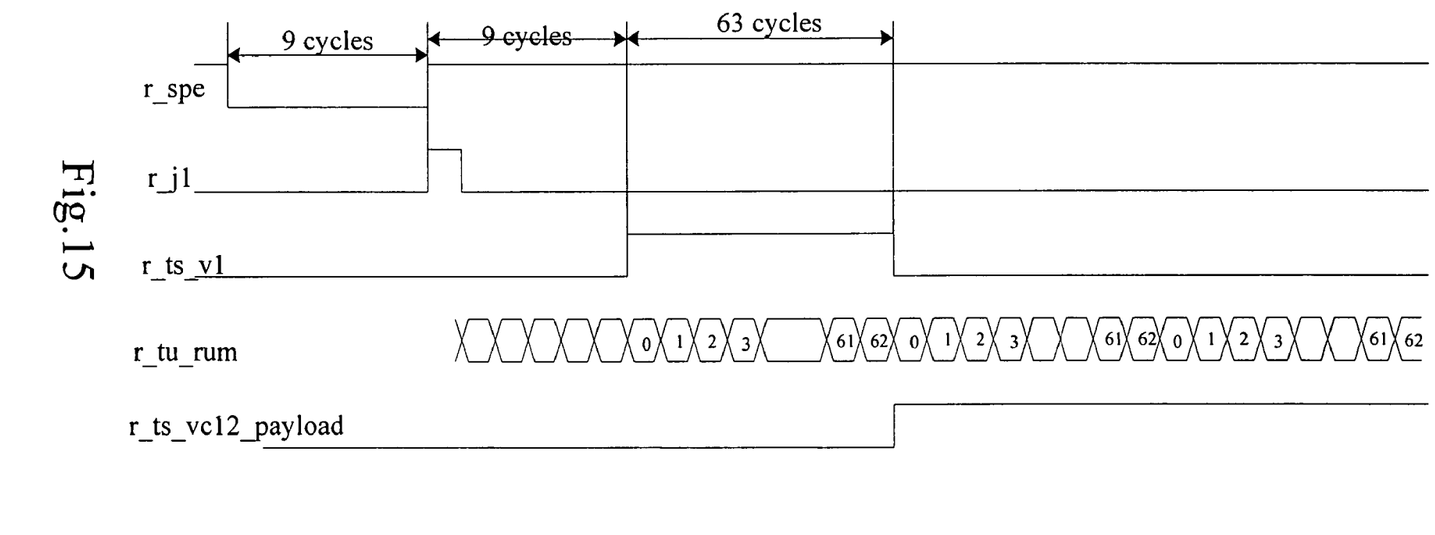
FIG. 15 shows receiving timing of the invention.

Based on the interpretation results, the receiving timer 111 obtains the indicating payload signals r_ts_vc12_payload and generates the writing addresses of the first memory 112 for the 63 channels to control the writing operation; the writing addresses are sent to the pointer generator module 113 to generate the positive or negative justification signals inc_dec_req. The timing diagram of the signals is shown in FIG. 15.

Figure 12:
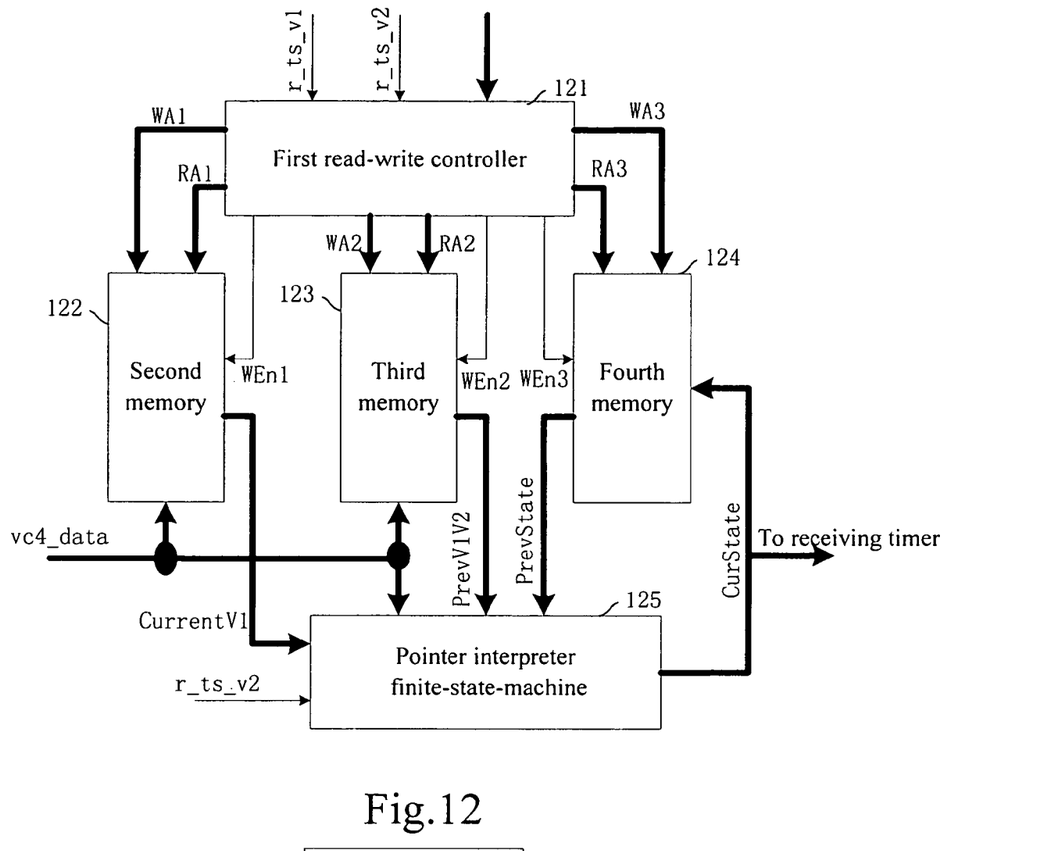
FIG. 12 shows a diagram of the pointer interpreter module of the invention.

In this embodiment, the pointer interpreter module 110 is shown in FIG. 12. It includes: the first read-write controller (RAMReadWriteControl) 121, the second memory 122, the third memory 123, the fourth memory 124 and the pointer interpreter finite-state-machine (PointerIntrpratFSM) 125.

The second memory 122, the third memory 123 and the pointer interpreter finite-state-machine 125 receive the VC4 frame data from the external system.

The first read-write controller 121 is respectively connected with the receiving timer 112, the second memory 122, the third memory 123 and the fourth memory 124, and controls the accesses of them in order to coordinate with the pointer interpreter finite-state-machine 125.

The second memory 122 and the third memory 123 latch the V1 bytes of this frame and the V1 and V2 bytes of last frame respectively; the fourth memory 124 stores interpretation results including the states of the pointer interpreter finite-state-machine 125, the pointer value, the positive and negative justification values, and outputs the results to the receiving timer 111.

The pointer interpreter finite-state-machine 125 is connected with the second memory 122, the third memory 123, the fourth memory 124 and the receiving timer 111 respectively. It interprets the pointer information of the received vc4_data and stores the interpretation results in the fourth memory 124.

The channel pointer of a TU12 includes two bytes, V1 and V2, and the pointer interpreter finite-state-machine 125 takes the r_ts_v2 signal sent by the timer 111 as the enable signal, so the pointer interpreter finite-state-machine 125 runs on the V2 byte of every frame, and its operation conforms to the related proposals of ITU. The operation of the pointer interpreter finite-state-machine 125 uses V1 and V2 bytes of the last and this frames, and it runs on the V2 byte of this frame, so only the last frame V1 and V2 bytes and this frame V1 byte need to be latched.

In detail, the first read-write controller 121 receives the indicating pulses: r_ts_v1, r_ts_v2 and r_tu_num, from the receiving timer 111 to control the intercepting and storing of the V1 and V2 bytes. When the r_ts_v1 is coming, namely at the V1 pulse position, the enable signal WEn1 of the second memory 122 is made enabled to let the second memory 122 get V1 information of all channels from the received vc4_data and store them. When the r_ts_v2 is coming, namely at the V2 pulse position, the enable signal WEna2 of the third memory 123 is made enabled to let the third memory get V2 information of all channels from the received vc4_data and the V1 information from the second memory 122, and store them.

One step delays the V2 pulse and when the pointer interpreter finite-state-machine 125 has processed one channel, the writing enable WEn3 of the fourth memory 123 is enabled to store the interpretation results of a channel. Here, the r_tu_num is used to indicate which channel is being processed.

In this embodiment, the first memory 112 is used to store each channel payload and pointers that are generated by the pointer generator module 113. The first memory 112 stores the payload based on the payload-writing signal from the receiving timer 111, and makes alignment and then outputs the aligned VC4 frame based on the reading signal from the transmitting timer 114. The first memory 112 stores the starting position of each VC frame, indication_or_v5_puls, which is used to indicate the starting position of each VC12 frame for the pointer generator module 113, and stores payloads of each channels.

Figure 13:
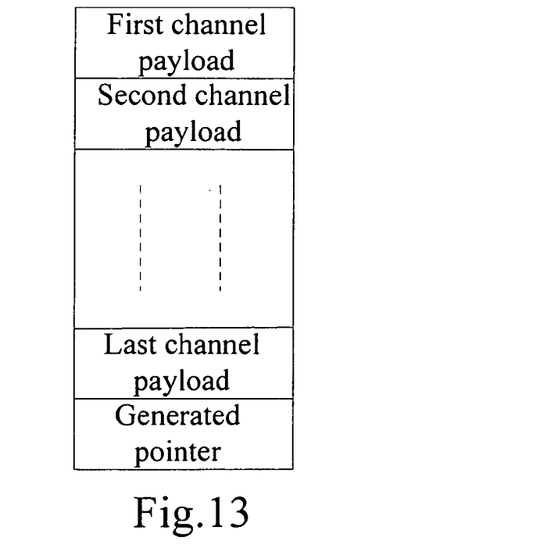
FIG. 13 shows a space division diagram of the first memory of the invention.

In this embodiment, the first memory 112 is divided into two parts: one is for storing the payload, and another is for storing the new pointer. In FIG. 13, there are 63 pieces of memory space for storing the payloads of 63 tributary units, and there are 63 bytes for storing the regenerated pointers. Since the new pointer is written into the first memory 112 by the pointer regenerator module 113 while the received payload is also written into the first memory, writing conflict may happen. It is necessary to avoid the writing conflict by adding conflict management in writing operation.

The transmitting timer 114 has a similar function to the receiving timer 111. According to the VC4 frame signals, including the VC4 payload indicating signal t_spe and the VC4 frame starting signal t_j1, the transmitting timer 114 generates timing signals for the aligned VC4 frame.

In detail, the positions of every signal in a VC4 frame are relatively fixed to the starting signal t_j1, and the transmitting timer 114 respectively generates the indicating pulses r_ts_v1 and r_ts_v2 for the first byte V1 and the second byte V2, which are used to indicate pointers of 63 channels; the indicating pulses r_ts_v3 and r_ts_v3p for the pointer justification bytes V3 and V3p of the 63 channels; the sequential counter signal r_tu_num indicating sequence of the 63 channels and the indicating pulse r_ts_h4 for the path overhead byte H4.

Furthermore, according to results generated by pointer generator module 113, including pointer value and positive or negative justification information, the t_ts_c12_payload signal indicating VC12 payload of 63 channels is obtained. Based on t_ts_vc12_payload, reading address of the first memory 113 is created to control reading of the first memory and finally, the new aligned VC4 is gotten. The time sequence in transmitting is similar to that in receiving, so the time sequence diagram of receiving can be as a reference. The t_ts_v1, t_ts_v2 and t_tu_num are sent to the pointer regenerator module 113 by transmitting timer 114.

Figure 14:
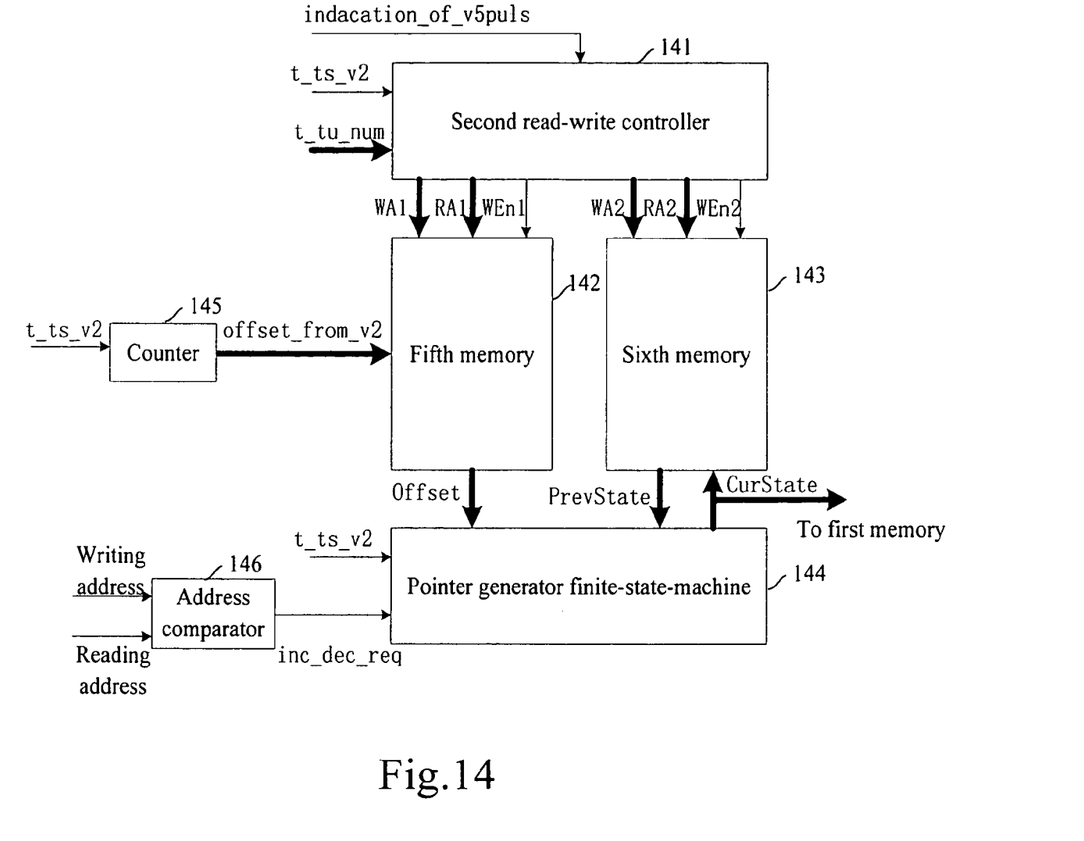
FIG. 14 shows a diagram of the pointer generator module of the invention.

In this embodiment, the pointer regenerator module 113, shown in FIG. 14, regenerates pointer, the positive justification or negative justification for every channel. It includes: the second read-write controller 141, the fifth memory 142, the sixth memory 143, the pointer generator finite-state-machine (PointerGenerateFSM) 144, the counter 145, and the comparator 146.

The second read-write controller 141 is connected with the first memory 112, the transmitting timer 114, the fifth memory 142, and the sixth memory 143, respectively; it controls the reading and writing of the fifth memory 142 and the sixth memory 143.

The fifth memory 142 transmits the regenerated pointer. When the second read-write controller 141 has read a V5, namely indication_of_v5puls, the first byte position signal of the VC12, it generates the writing address WA1 and the write-enable signal WEn1 for the fifth memory 142 and stores offset_from_v2 of counter 145 into the fifth memory 142.

The counter 145 increases the channel counting value by one when one byte of related channel is read from the first memory 112. It is used for all channels and begins counting at the V2 byte of each channel.

For the sixth memory 143, the pointer generator finite-state-machine 144 begins running at the V2 byte, namely at the moment when receiving the t_ts_v2, so it generates writing address WA2 and writing enable signal WEn1 one step delay the V2 byte of each channel and stores the new created pointer state PrevState into the sixth memory 143.

The second read-write controller 141 reads the fifth memory 142 and the sixth memory 143 in the same way. Since the pointer generator finite-state-machine 144 begins running at the V2 byte, the read control for the second read-write controller 141 is to make the pointer offsets, the last frame pointer states and the positive or negative justification information inc_dec_req of the two memories arrive at the same time.

The second read-write controller 141 reads the pointer offset from the off_from_v2 of the fifth memory 142. The comparator 146 generates the positive or negative justification bytes inc_dec_req by comparing the writing address generated by the receiving timer 111 and the reading address generated by the transmitting timer 114. The positive or negative justification bytes inc_dec_req is used to determine whether the generated pointer needs to be adjusted or whether the V3 and V3P need to stuff effective data; this is determined by the receiving and transmitting rate difference. In this embodiment, the receiving and transmitting rate difference is the memory reading and writing rate difference. This means that the reading and writing address difference and the justification threshold determine whether the inc_dec_req is effective.

The pointer generator finite-state-machine 144 is a finite-state-machine for generating pointer based on proposals from ITU.T. It begins running at the moment receiving the V2 byte and reads pointer offset from the fifth memory 142 and the sixth memory 143, the last frame states PrevState and the positive or negative justification information inc_dec_req to generate the new pointer and pointer state CurState. After new pointer generates, namely a step delay the t_ts_v2, the pointer generator 114 stores new pointer and pointer state CurState into the sixth memory 143 and output them to the first memory 112.

It can be seen from the above that the pointer interpreter module 110 and the pointer generator module 113 are two independent modules. The pointer interpreter module 110 interprets the receiving pointer to obtain the payload from the received data and store it in the first memory 112. The pointer generator module 113 generates the new pointer for the new tributary unit based on the timing requirement and the rate difference between receiving and transmitting.

The frame alignment procedure is described in the following:

The receiving timer 111 generates the receiving pulse r_ts_v1 that indicates the first byte V1 position of TU12 channel pointer based on information of frame structure, and the pointer interpreter module 110 receives and stores the first byte V1 of all channels based on the receiving pulse r_ts_v1.

The receiving timer 111 generates the receiving pulse r_ts_v2 that indicates the position of the pointer second byte V2 of the TU12, and the pointer interpreter module 110 receives and stores the second byte V2 of all channels based on the receiving pulse r_ts_v2.

While receiving the second byte receiving pulse of channel pointer, the pointer interpreter module 110 interprets the channel pointer to obtain the pointer states and then according to the states, the pointer interpreter module 110 generates control signal to store the channel payload into the first memory 112.

The transmitting timer 114 generates timing signals for the pointer generator module 113 based on the indicating signal of the new frame from an external system, and the pointer generator module 114 sequentially generates the new pointer of every channel according to the pointer offset and stuffing bytes of each channel and stores the new pointers into the first memory.

The transmitting timer 114 generates control signals based on the new frame timing signal and results from pointer generator. With the control signals, the transmitting timer reads the payload and pointer of each channel from the first memory to form a data frame for the system.

The TU12 is taken as an example in above, and the method for TU3, TU11 or the mixture of TU11, TU12 and TU3 is quite similar. The only difference is that different timing pulses are generated.

For more tributaries alignment, such as four or even sixteen VC4s alignment, the same method can be used if only higher clock frequency or more memory capacity are provided.

The SDH and the SONET are almost the same hierarchies except part of transmission rates and multiplexing paths are slightly different. The above embodiment uses SDH as an example, however, the principle can be completely applied in the SONET system.

What is claimed is:

1. A frame aligning method implemented by a frame aligning integrated circuit, the method comprising:
    the frame aligning integrated circuit processing every channel of a frame in a time sharing manner, wherein the frame aligning integrated circuit includes a receiving timer, a pointer interpreter module, a transmitting timer, a pointer generator module, and a first memory, and wherein the pointer interpreter module comprises a first read-write controller, a second memory, a third memory, a fourth memory, and a pointer interpreter finite-state-machine;
    based on the structure and control information of a frame to be aligned, the receiving timer generating a receiving pulses indicating positions of a channel pointer's first byte and second byte;
    the first read-write controller in the pointer interpreter module receiving timing signals generated by the receiving timer to create read-write control signals to the second, third, and fourth memories;
    under control of the first read-write controller, the second and third memories storing channel pointer information of a frame received or outputting the channel pointer information to the pointer interpreter finite-state-machine;
    under control of the first read-write controller, the fourth memory storing pointer state information sent by the pointer interpreter finite-state-machine or sending the pointer state information to the pointer interpreter finite-state-machine, and at specific timing signals provided by the receiving timer, the pointer interpreter finite-state-machine interpreting signals in the second, third, and fourth memories, storing interpretation results in the fourth memory, and outputting the interpretation results to the receiving timer;
    generating, by the transmitting timer, a time signal for a new frame required and providing to the pointer generator module;
    based on pointer offset and adjustment information of each channel, the pointer generator module creating new channel pointers for all channels;
    generating the control signal according to timing signals of the new frame and the new channel pointers generated by the pointer generator module;
    with the control signal, reading the payload and generated pointer of each channel to form aligned data frame.

2. The method of claim 1, wherein the creating new channel pointers, respectively, comprises:
    depending on channel payload, the pointer generator module calculating the offset of the channel pointer; and
    the new pointer and state information of the channel being created and stored based on the offset, channel adjustment information, and state information of last frame.

3. The method of claim 2, wherein the creating new channel pointer is realized according to International Telecommunication Union (ITU) Recommendations G.707.

4. The method of claim 1, wherein the payloads and generated pointers of all channels are stored in the first memory.

5. The method of claim 4, wherein address collision is avoided for the first memory.

6. A frame aligning integrated circuit comprising a receiving timer, a pointer interpreter module, a transmitting timer, and a pointer generator module, and the pointer generator module comprises a first-write controller, a first memory, a second memory, a third memory, a fourth memory, and a pointer interpreter finite-state-machine;
    wherein said the receiving timer is connected with the pointer interpreter module and the first memory, respectively, receives a frame to be aligned and the frame control signals, and then based on the frame control signals, it generates timing signals indicating different positions of frame signals, and sends the timing signals to pointer interpreter module, and based on the timing signals and pointer interpretation results given by the pointer interpreter module, it controls the first memory to store frame data; wherein the pointer interpreter module is connected with the receiving timer, receives frame to be aligned, under control by the timing signals from the receiving timer, interprets channel pointers of Tributary Units in a frame and sends pointer interpretation results to the receiving timer;

wherein the transmitting timer is connected with the pointer generator module and the first memory, receives control signals for new frame system, based on the frame control signals, it generates timing signals indicating different positions of a new frame, based on the timing signals and new channel pointer state sent by the pointer generator module, controls the first memory to read frame data;

wherein the pointer generator module is connected with the transmitting timer and the first memory, under control of timing signals provided by the transmitting timer, creates new channel pointers of Tributary Units and stores the new channel pointers into the first memory;

wherein the first memory is connected with the receiving timer, transmitting timer and the pointer generator module, stores payloads of all channels under the control of timing signals provided by the receiving timer, stores newly generated pointers of all channels, and outputs payloads and new pointers of all channels under the control of timing signals provided by the transmitting timer;

wherein the first read-write controller is connected with the receiving timer, the second memory, the third memory, and the fourth memory, receives timing signals generated by the receiving timer to create read-write control signals to the second, third, and fourth memories;

wherein the second and third memories are connected with the first read-write controller and wherein the pointer interpreter finite-state-machine, under control of the first read-write controller, stores channel pointer information of frame received, or output the channel pointer information to the pointer interpreter finite-state-machine;

wherein the fourth memory is connected with the first read-write controller and wherein the pointer interpreter finite-state-machine, under control of the first read-write controller, stores pointer state information sent by the pointer interpreter finite-state-machine, or sends pointer state information to the pointer interpreter finite-state-machine; and wherein the pointer interpreter finite-state-machine is connected with the second, third, and fourth memories, at specific timing signals provided by the receiving timer, interprets signals in the second, third, and fourth memories, stores interpretation results in the fourth memory, and outputs the interpretation results to the receiving timer.

7. A frame aligning integrated circuit comprising a receiving timer, a pointer interpreter module, a transmitting timer, and a pointer generator module, and the pointer generator module comprises a first-write controller, a second read-write controller, a first memory, a second memory, a third memory, a fourth memory, a fifth memory, a sixth memory, and a pointer interpreter fin ite-state-machine;

wherein the receiving timer is connected with the pointer interpreter module and the first memory, respectively, receives frame to be aligned and the frame control signals, based on the frame control signals, it generates timing signals indicating different positions of frame signals, and sends the timing signals to the pointer interpreter module, and based on the timing signals and pointer interpretation results given by the pointer interpreter module, it controls the first memory to store frame data;

wherein the pointer interpreter module is connected with the receiving timer, receives frame to be aligned, under control by the timing signals from the receiving timer, interprets channel pointers of Tributary Units in a frame and sends pointer interpretation results to the receiving timer;

wherein the transmitting timer is connected with the pointer generator module and the first memory, receives control signals for new frame system, based on the frame control signals, it generates timing signals indicating different positions of a new frame, based on the timing signals and new channel pointer state sent by the pointer generator module, controls the first memory to read frame data;

wherein the pointer generator module is connected with the transmitting timer and the first memory, under control of timing signals provided by the transmitting timer, creates new channel pointers of Tributary Units and stores the new channel pointers into the first memory;

wherein the first memory is connected with the receiving timer, transmitting timer and the pointer generator module, stores payloads of all channels under the control of timing signals provided by the receiving timer, stores newly generated pointers of all channels, and outputs payloads and new pointers of all channels under the control of timing signals provided by the transmitting timer;

wherein the second read-write controller is connected with the transmitting timer, fifth memory and sixth memory, receives timing signals from transmitting timer to generate read-write control signal for the fifth and sixth memories;

wherein the fifth memory is connected with the second read-write controller and the pointer generator finite-state-machine, stores the channel pointer offset and outputs them to the pointer generator finite-state-machine;

wherein the sixth memory is connected with the second read-write controller and the pointer generator finite-state-machine, stores frame states; and wherein the pointer generator finite-state-machine is connected with the transmitting timer and the fifth and sixth memories, under a specific timing signal from the transmitting timer and according to signals stored in the fifth and sixth memories, it generates new pointer and the pointer's state, stores the state in the sixth memory, and outputs the state to the first memory.

8. The circuit of claim 7, wherein the pointer generator module includes a common counter for all channels;

wherein the counter is connected with the fifth memory, starts counting at the second address of each channel, increases count value of a relevant channel by one after it reads one byte from the first memory, and creates pointer offset and outputs it to the fifth memory.

9. The circuit of claim 7, wherein the pointer generator module includes an address comparator;

wherein the address comparator is connected with the receiving timer and the transmitting timer, receives the writing address generated by the receiving timer and reading address generated by the transmitting timer, compares them to determine whether the positive justification or negative justification is needed, and then sends justification information to the pointer generator finite-state-machine.

10. The method of claim 1, wherein the pointer generator module comprises a second read-write controller, a fifth memory, a sixth memory, and a pointer generator finite-state-machine; and the pointer generator module creating new channel pointers for all channels comprises:

receiving, by the second read-write controller, timing signals from the transmitting timer to generate a read-write control signal for the fifth and sixth memories;

storing the channel pointer offset and outputting them to the pointer generator finite-state-machine by the fifth memory, and storing frame states by the sixth memory; and under a specific timing signal from the transmitting timer and according to signals stored in the fifth and sixth memories, the pointer generator finite-state-machine generating a new pointer and the pointer's state, and storing the state in the sixth memory and outputting the state to the first memory.

* * * * *

UNITED STATES PATENT AND TRADEMARK OFFICE
CERTIFICATE OF CORRECTION

PATENT NO. : 7,639,673 B2  Page 1 of 1
APPLICATION NO. : 11/242451
DATED : December 29, 2009
INVENTOR(S) : Fengguo Yang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Ninth Day of November, 2010

David J. Kappos
*Director of the United States Patent and Trademark Office*